3 Sheets—Sheet 1.
W. E. & J. C. BUTLER.
Wire-Barbing Machine.
No. 226,276. Patented April 6, 1880.
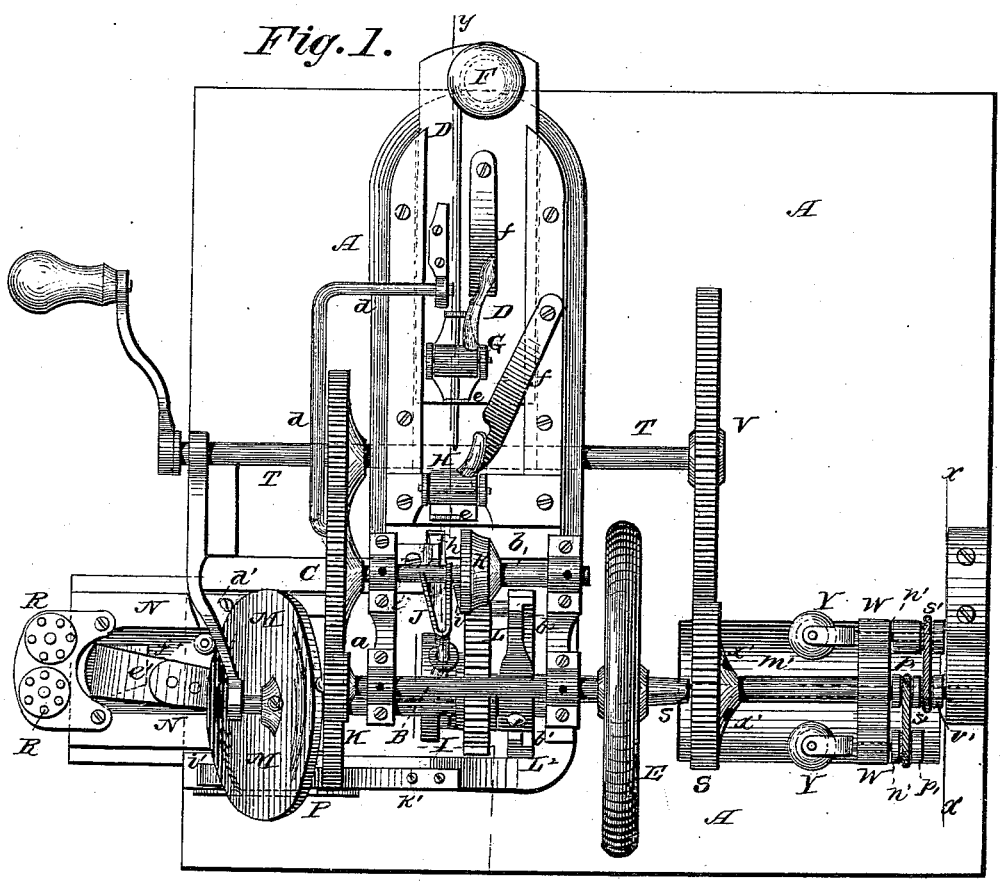
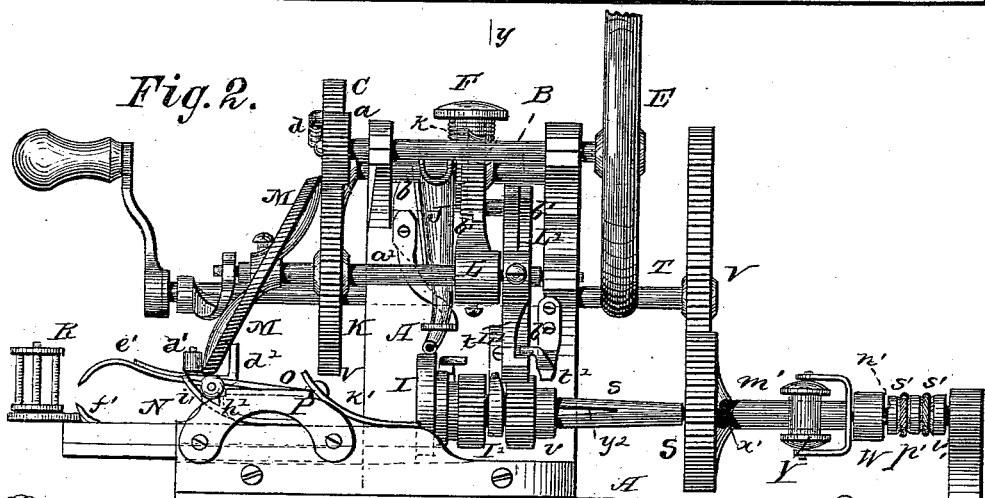
Witnesses:
P. L. Dietrich.
F. W. H. Duffy.
Inventors:
Wm. E. Butler.
Jos. C. Butler.
Per C. H. Watson & Co. Attorneys.

W. E. & J. C. BUTLER.
Wire-Barbing Machine.

No. 226,276.  Patented April 6, 1880.

Witnesses:
P. C. Dieterich
Frank H. Duffy

Inventors:
Wm. E. Butler.
Jos. C. Butler.
Per C. H. Watson & Co.
Attorneys.

W. E. & J. C. BUTLER.
Wire-Barbing Machine.
No. 226,276. Patented April 6, 1880.
Fig. 5.
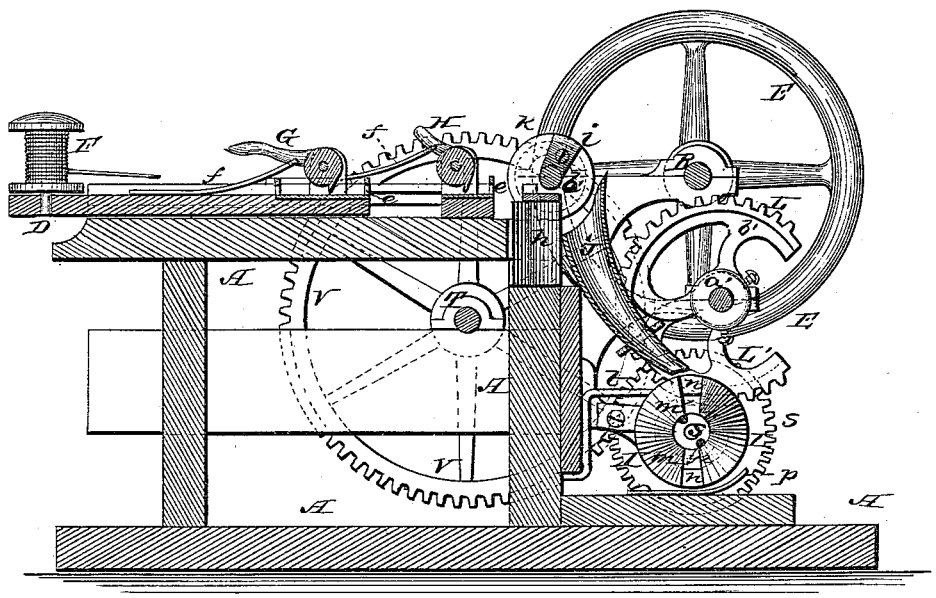
Fig. 6.
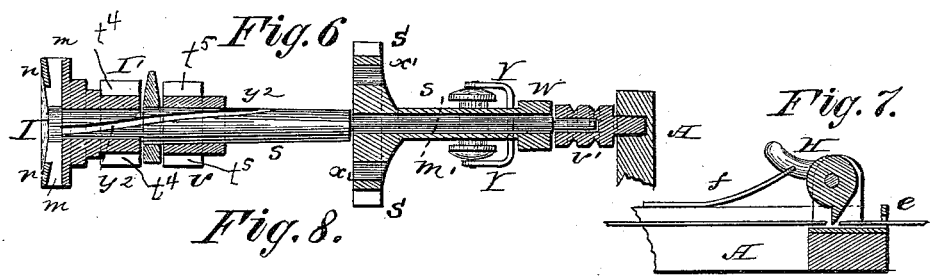
Fig. 7.
Fig. 8.
Fig. 9.
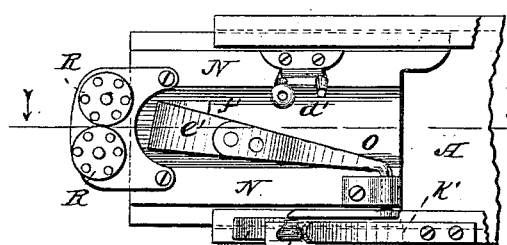
Fig. 10.
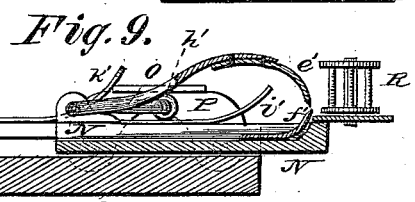
Witnesses:
P. C. Dietrich.
Frank H. Duffy.
Inventors:
Wm. E. Butler.
Jos. C. Butler.
Per C. H. Watson & Co. Attorneys.

UNITED STATES PATENT OFFICE.

WILLIAM E. BUTLER AND JOSEPH C. BUTLER, OF EAGLE CITY, IOWA.

WIRE-BARBING MACHINE.

SPECIFICATION forming part of Letters Patent No. 226,276, dated April 6, 1880.

Application filed January 22, 1879.

*To all whom it may concern:*

Be it known that we, WILLIAM E. BUTLER and JOSEPH C. BUTLER, of Eagle City, in the county of Hardin and State of Iowa, have invented certain new and useful Improvements in Machines for Making Barbed Fence-Wires; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

The nature of our invention consists in the construction and arrangement of a machine for making barbed fence-wires, as will be hereinafter more fully set forth.

Figure 3:
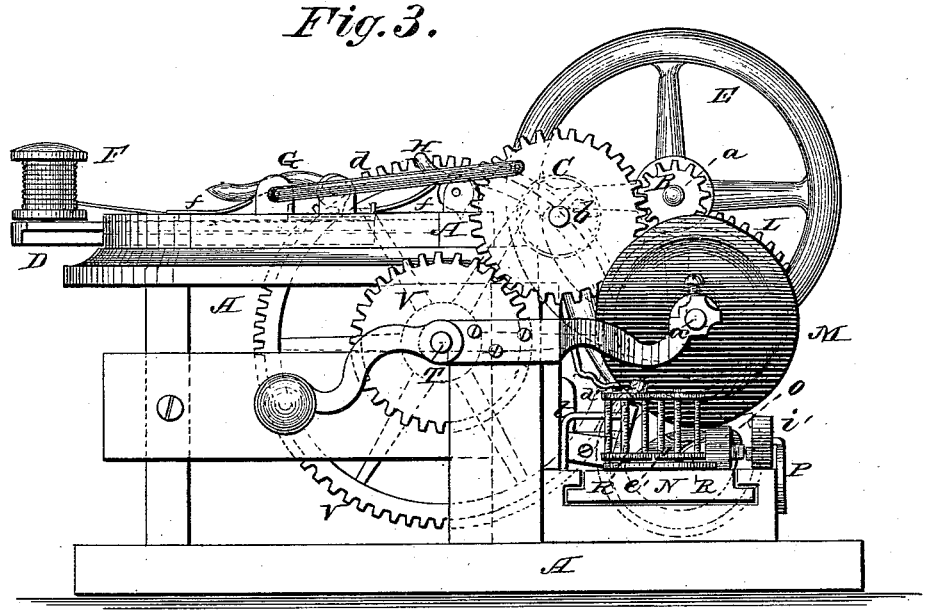
Figure 4:
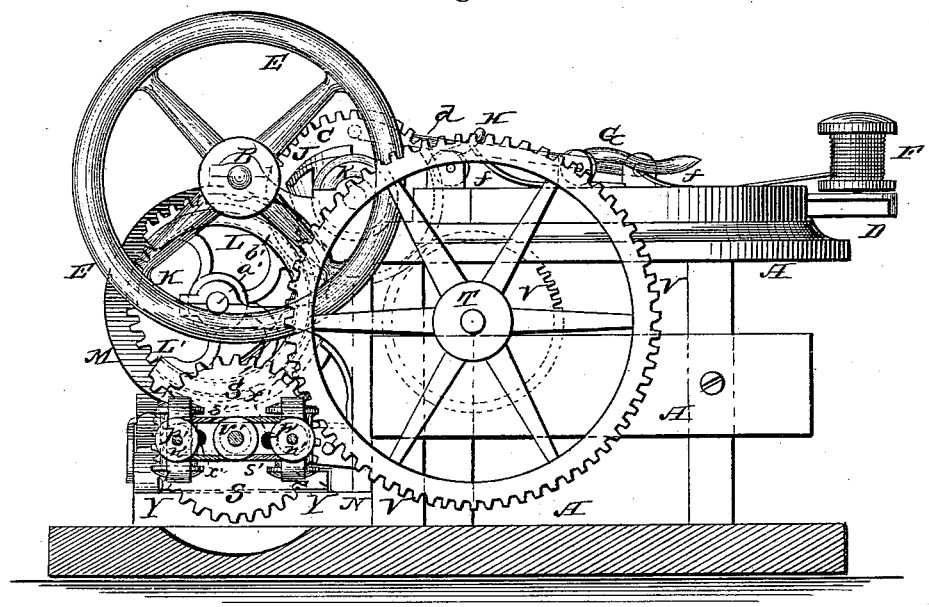

In the annexed drawings, Figure 1 is a plan view of our machine. Fig. 2 is a front elevation, and Fig. 3 a side elevation, of the same. Fig. 4 is a vertical section on the line $xx$, Fig. 1. Fig. 5 is a similar section on the line $yy$, Fig. 1. Figs. 6 to 10 are detailed views of parts of the machine.

A represents the frame-work of the machine, constructed in any suitable manner to receive the various working parts.

In suitable bearings on or attached to the frame is placed the main shaft B, to which power may be applied in any convenient manner; or the machine may be run by hand, if desired. On the main shaft B is secured the fly or balance wheel E, and also a pinion, $a$, which latter meshes with a cog-wheel, C, upon a shaft, $b$, running parallel with the main shaft.

The cog-wheel C is, by a crank or pitman, $d$, connected with a platform, D, which slides back and forth in ways on the frame A. This slide or sliding platform carries at its outer end a spool, F, containing the wire from which the barbs are to be made.

Near the inner end of the slide D is arranged a clamp, G, for holding the wire from the spool F, and upon the frame A is a similar clamp, H, for the same purpose. These clamps G and H are provided with springs $ff$, and so constructed and arranged that when the slide D moves inward the clamp G will take hold of the wire and pull the same along, the clamp H opening to the wire and allowing it to pass under the same. When the slide moves outward again the clamp H, being stationary, will take hold of the wire and hold it, while the clamp G, moving with the slides D, slides over the wire to take a new hold thereon and feed the wire forward as soon as the slide commences to move inward again.

In front of each clamp is an eye or guide, $e$, through which the wire passes. In front of the stationary clamp H and its guide is a stationary knife, $h$, over which the wire passes, and is cut off by a knife, $i$, attached to a disk, $k$, secured upon the shaft $b$, thus cutting the wire in proper lengths for the barbs. The knives $h$ and $i$ are arranged at an angle, so as to cut the wire diagonally or at an angle instead of straight across, and thus both ends of the barb become pointed in the act of cutting.

The length of the barbs depends upon the length of stroke of the slide D, and this may be regulated by changing the pitman $d$ to and from the center of the wheel C.

The barb-wires, after being cut, pass down through a spout, J, and drop into a diametrical groove, $m$, made in the face of a disk, I, and each end of this groove has a plate or spring, $n$, across it inserted in the face of the disk. Under the disk I is a guard, $p$, which prevents the wire from dropping out.

The disk I is provided with a pinion, I', on its hub, and is placed loosely upon the inner end of a shaft, $s$, and it is held in position to receive the wire from the spout by means of a spring-catch, $t$, entering a notch, $t^4$, in the hub of the disk.

The shaft $s$ is provided with a pinion, $v$, and a spring-catch, $t'$, is arranged to take into notches $t^5$ on the shaft to hold the same in proper position while the barb-wire passes between the fence-wires.

The cog-wheel C meshes with a cog-wheel, K, on a shaft, $a'$, and on this shaft are secured two cogged segments, L L', to mesh with and rotate the pinions I' and $v$, respectively.

The segments L L' are provided with side flanges, $b' b'$, for raising the catches $t$ and $t'$ out of their respective notches just at the times when the pinions are to be rotated.

On the shaft $a'$ is secured an inclined wheel, M, which works in a fork, $d'$, secured to and projecting from a slide or sliding platform, N, moving in suitable guides on the frame A. On this slide is hinged a crank, O, one end of which is provided with a spring, $e'$, to bear against a stationary jaw, $f'$, on the slide. The other end or arm of the crank is turned outward, and has a roller, $h'$, thereon. This roller, when the slide moves outward, passes under a stationary guide, P, on the main frame, whereby the spring $e'$ is made to press upon the fence-wires just as the barb is finished and has been lapped upon the wires with sufficient force to cause the wires to be drawn the required distance for the next barb. After moving this distance the roller $h'$ is, by means of a spring, $i'$, at the outer end of the guide P, made to raise and lift the spring $e'$, the said roller during the inward movement of the slide N passing over the guide.

At the inner end of the guide is another spring, $k'$, under which the roller passes, and is made to get down under the guide, so that the spring $e'$ will again press on the fence-wires.

At the outer end of the slide N are two upright slotted rollers, R R, between which the barbed wire passes to be wound upon an ordinary spool or reel by a suitable belt connected with the machine.

On the outer portion of the shaft $s$ is placed a sleeve, $m'$, upon which is secured a cog-wheel, S. This cog-wheel and sleeve receive a continuous rotary motion from the cog-wheel C through the medium of a counter-shaft, T, with cog-wheels V V thereon, as shown.

On the sleeve $m'$ is secured a cross-head, W, carrying at each end a shaft, $n'$, the inner end of which is forked and has a spool, Y, mounted therein. On the outer end of each shaft $n'$ is a pulley, $p'$, and the two pulleys are, by belts or cords $s'$ $s'$, connected with a stationary circumferentially-grooved bearing, $v'$, as shown.

The wires for forming the fence-wire and on which the barbs are to be fastened are placed on the spools Y Y, and pass from said spools through holes $x'$ $x'$ in the wheel S into grooves $y^2$ on the shaft $s$ at the point where the pinion $v$ is attached, and thence through the center of the disk I to the clamp formed by the spring $e'$ and jaw $f'$.

The operation of the machine is very simple, and can be briefly described as follows: The spools Y have a rotary motion around the shaft; but they remain at all times in the same position on account of the pulleys $p'$, cords or belts $s'$, and the stationary bearing $v'$; hence neither wire is twisted separately, but the two wires will be twisted together. During the time the slide N moves outward the required distance the barb-wire has been fed forward, cut and dropped through the spout, so as to pass between the two fence-wires at the proper point. The segment L now engages with the pinion I' and gives the wheel I a number of revolutions sufficient to wind the barb around the fence-wires. The segment L' then engages with the pinion $v$ and rotates the shaft $s$ to give the required wind of the fence-wires. During these operations the slide D has been moved outward and the slide N inward to take new holds of their respective wires for their next movements. The winding of the barb-wire around the fence-wires shortens the former, so that the points will pass out from under the plates $n$ at the ends of the groove $m$ in the disk I.

It will be understood that the relative proportions of the pinion $v$, cog-wheel S, and the gearing should be such that while the wheel S and sleeve $m'$ revolve continuously the intermittent motion of the pinion $v$ and the shaft $s$ will be sufficient to compensate for and prevent the wires from being wound around the shaft more than hereinafter described.

After the barb has passed into the winding device I, and has been by the rotation thereof wound around the fence-wires, and while the barbed wires are being fed, the shaft $s$ commences to rotate forward for the purpose of twisting the main wires from the point where they issue from the front end of the shaft $s$ to the point where the last barb was wound. Since the twisting-shaft $s$ rotates faster than the wheel S, it will twist the wires between the points where they enter the grooves $y^2$ in this shaft $s$ and the holes $x'$ in the wheel S. If this twist were carried too far, the wires would be bound around the shaft and the feed would be prevented, and at length the wires would be broken.

This binding or breaking is prevented as follows: The faster-moving shaft $s$ has carried the back ends of the grooves $y^2$ ahead of the holes $x'$ in the slower wheel S. This tends to bind the wires, whereupon the shaft $s$ stops and the wheel S advances its holes $x'$ until the main wires leading from $x'$ to $y^2$ are in line with the parts of the wires in the grooves $y^2$, when the wires are pulled forward by the feed without binding at the rear ends of the grooves $y^2$.

We are aware that a non-rotating holder having two or more apertures for the passage of the main wires, in combination with the coiling-cylinder revolving on the holder, also a non-rotating guide and holder for the main fence-wires, adapted to permit their passage along it, and at the same time to prevent them from twisting around each other at their guided portions, in combination with a barb-winder surrounding such guide and with means for imparting a rotary movement to the winder, are not new, and we do not claim such, broadly, as our invention; but,

Having thus fully described our invention, what we claim as new, and desire to secure by Letters Patent, is—

1. In a machine for making barbed fence-wires, the reciprocating slide D, carrying the spool F and clamp G, in combination with the clamp H, all constructed and operating substantially as and for the purposes herein set forth.

2. The intermittingly-rotating disk I, provided with a central groove, $m$, across its face, and plates $n$, arranged at the ends of said groove, substantially as and for the purposes herein set forth.

3. The combination of the disk I, with pinion I', grooved shaft $s$, with pinion $v$, the catches $t\,t'$, and the cogged segments L L', having side flanges, $a'\,a'$, all substantially as and for the purposes herein set forth.

4. The reciprocating slide N, with crank O, having spring $e'$ and roller $h'$, and the jaw $f'$, in combination with the stationary guide P and springs $i'\,k'$, all constructed and arranged substantially as and for the purposes herein set forth.

In testimony that we claim the foregoing as our own we have hereto affixed our signatures in presence of two witnesses.

WILLIAM E. BUTLER.
JOSEPH CORYDON BUTLER.

Witnesses:
   J. L. HUNTER,
   W. S. PRESTON.